United States Patent

Claytor et al.

[11] Patent Number: 5,935,664
[45] Date of Patent: Aug. 10, 1999

[54] PACKAGING MATERIAL HAVING GOOD MOISTURE BARRIER

[75] Inventors: Robinson C. Claytor, Covington, Va.; Mohan Sasthav, Elkridge, Md.

[73] Assignee: Westvaco Corporation, New York, N.Y.

[21] Appl. No.: 08/955,223

[22] Filed: Oct. 22, 1997

[51] Int. Cl.$^6$ ........................................................ B27N 5/02
[52] U.S. Cl. .................. 428/34.2; 428/36.6; 428/340; 428/537.5; 428/507; 428/511
[58] Field of Search ................................ 428/34.2, 36.6, 428/340, 507, 57.35, 511

[56] References Cited

U.S. PATENT DOCUMENTS

| | | | |
|---|---|---|---|
| 2,392,972 | 1/1946 | Cheyney | 117/76 |
| 3,231,411 | 1/1966 | Tyler et al. | 117/76 |
| 3,476,587 | 11/1969 | Demol et al. | 117/76 |
| 3,579,371 | 5/1971 | Dooley et al. | 117/76 |
| 3,707,393 | 12/1972 | McDonald | 117/76 |
| 4,300,969 | 11/1981 | Frydendal | 156/244.11 |
| 4,795,665 | 1/1989 | Lancaster et al. | 428/34.2 |
| 4,895,747 | 1/1990 | Birkholz et al. | 428/42 |
| 5,286,538 | 2/1994 | Pearlstein et al. | 428/34.2 |
| 5,418,008 | 5/1995 | Calvert | 427/203 |
| 5,496,601 | 3/1996 | Schurb | 428/40 |

OTHER PUBLICATIONS

"High Barrier Polymers", by A. L. Blackwell, Tappi Notes of the 1986 Tappi Coextrusion Seminar pp. 13–18.

*Primary Examiner*—Robert Dawson
*Assistant Examiner*—Caixia Lu-Rutt

[57] ABSTRACT

Packaging material prepared from a paper or paperboard substrate which includes a layer of moisture barrier material is made resistant to loss of its moisture barrier characteristics when the packaging material is scored and bent during any converting operation by the addition of a layer of flexible primer material located between the paper or paperboard substrate and the moisture barrier layer.

2 Claims, No Drawings

PACKAGING MATERIAL HAVING GOOD MOISTURE BARRIER

BACKGROUND OF INVENTION

The present invention relates to packaging and packaging materials, and more particularly to paper or paperboard substrates which include a moisture vapor barrier layer that also has good resistance to oxygen permeation. Examples of such barrier materials are disclosed in the article "High Barrier Polymers", by A. L. Blackwell, published in the TAPPI Notes of the 1986 TAPPI Coextrusion Seminar. It is also desirable in the manufacture of such products that the barrier materials be applied to the paper or paperboard at the same time that the products are printed and converted into packages as disclosed for example in U.S. Pat. No. 5,418,008. In order to satisfy both of these purposes, resins of polyvinylidene chloride (PVDC) in the form of aqueous coatings, which can be applied on a printing press, have been found to be successful.

Examples of prior art PVDC coated papers are illustrated, for example, in U.S. Pat. No. 2,392,972, which discloses kraft paper having a layer of a vinylidene chloride copolymer applied over an intermediate coating of a vinyl chloride-acetate copolymer to achieve good adhesion to the paper; U.S. Pat. No. 3,231,411, which discloses a layer of PVDC applied over a primer layer to a substrate comprising paper with a coating of polyethylene, where the primer layer acts as a binder between the polyethylene layer and the PVDC layer; U.S. Pat. No. 3,476,587, which discloses a substrate including two coatings of vinylidene chloride copolymers, one being hard and brittle, and the other being supple; U.S. Pat. No. 3,579,371, which discloses a packaging structure comprising a cellulosic substrate carrying an intermediate coating of PVDC resin and a top coating consisting of a blend of an alkyd resin and an amine-aldehyde resin; U.S. Pat. No. 3,707,393, which discloses a sheet material for form-fill packaging having heat seal properties wherein a top coating of PVDC is applied over an undercoating of a mixture of two copolymers consisting of (A) a copolymer of ethylene and a partially neutralized alpha, beta ethylenically unsaturated carboxylic acid, and (B) a copolymer of ethylene and a vinyl alkanoate and from 0 to 10% of an alpha, beta ethylenically unsaturated carboxylic acid; and U.S. Pat. No. 4,300,969, which discloses a packaging laminate consisting of a cardboard web having a layer of heat-sealable thermoplastic material applied to one surface, and three layers of plastic material on the other surface, wherein the middle of the three layers consists of PVDC. Each of the prior art patents described are directed to overcome certain problems inherent with the application of a PVDC resin to a cellulosic substrate, e.g., the difficulty in getting PVDC to adhere to paper or paperboard. However, none of these patents solve the problem addressed by the present invention.

SUMMARY OF INVENTION

The present invention is directed to the manufacture of packaging components and packaging materials that can be made in a single manufacturing operation. Preferably, the invention is directed to packaging material prepared from a paper or paperboard substrate where the substrate is coated with a layer of moisture barrier material, printed, and cut into blanks in a single operation. Such an operation eliminates the need for a separate off-line coating operation, such as extrusion coating. In the past such moisture barrier layers have been applied to paper and paperboard webs by extrusion coating, and extrusion coating not only adds another step to the manufacturing process, it also results in more waste from trimming and increases transportation costs. Also, in the case of extrusion coating, relatively high coat weights are required to get good coverage and satisfactory moisture barrier, whereas relatively low coat weights can be applied to form a continuous moisture barrier in the case of non-extrusion coatings.

The present invention is further directed to such packaging material which includes a layer of PVDC as a moisture barrier material. Acrylics, PVDC and PET are some of the commonly used water based coatings that can be applied to paper or paperboard on a printing press. However, it has been found that conventional water based coatings such as PVDC, when applied to paperboard, suffer from score cracking, i.e., cracking of the PVDC coating along score lines when the coated material is bent during converting operations. Semi-crystalline polymers like PVDC are not flexible enough to withstand scoring and bending. The result is that the moisture barrier normally provided by a coating of PVDC can be reduced by as much as 1–2 orders of magnitude during the converting operation where the packaging material is scored and bent. Thus there is a need to provide packaging material with good moisture barrier to withstand the converting operations, and particularly a need to provide a means for applying water based coatings to form a continuous barrier which is flexible enough to withstand scoring and bending without significant loss in barrier properties, especially moisture barrier. In the present invention, this need is addressed with the use of water based flexible primer coatings of polyvinylpyrrolidone (PVP), and flexible PVDC barrier coatings applied to coated-one-side (C1S) or coated-two-side (C2S) paperboard.

DETAILED DESCRIPTION

The present invention is directed to packaging components and packaging materials which include a layer of PVDC as a moisture barrier material. The invention is directed to an improved structure which prevents loss of moisture barrier properties when the packaging material is scored and bent, as for example, when the packaging material is converted into a package component such as a carton or container for food products or the like.

Paperboard which is extrusion-coated with low density polyethylene (LDPE) and overcoated with an aqueous barrier coating such as PVDC retains its good moisture barrier characteristics even after scoring and bending. Since the LDPE layer is more elastic than PVDC, it does not score crack significantly even though the PVDC coating may crack in the scored and bent areas. Thus, the LDPE layer provides some level of barrier protection in the cracked areas. However such a product may not be cost effective since it involves two different coating operations, i.e., extrusion coating of the LDPE layer, and application of the PVDC layer either by extrusion coating or on a printing press.

To overcome the need for two coating operations, an investigation was initiated to develop a coated paperboard product with good moisture barrier characteristics after scoring and bending that could be made in one pass on a printing press. For this purpose PVDC and flexible primer coatings of PVP (from Morton International) were applied to the uncoated side of 0.018 C1S paperboard, and to one of the coated surfaces of C2S paperboard. The coatings were applied using a reverse gravure coater at target coat weights of 4 lbs/ream primer coat and 4 lbs/ream top coat (ream size 3000 ft$^2$). The C1S and C2S basestocks were preheated to 128° F. to reduce pinholes in the primer coat. In addition, a different PVDC coating was applied to corona-treated polyethylene-coated paperboard basestock.

Results of moisture vapor transmission measurements at 100° F./90% RH for these products are shown in Table 1. For comparison, a commercial cake mix bag material (usually, a high density polyethylene and ethylene vinyl alcohol coextruded film) has MVTR of 0.3 gm/100 in$^2$/day. The commercial bag is not scored or creased in actual use. MVTR of PVDC/LDPE/board was about 0.7 gm/100 in$^2$/day before and after scoring. A combination of a PVP primer coat (ADCOTE 56-102) and a top coat of Serfene 24X106 (both products of Morton International), on C2S paperboard provided the best barrier among the non-extrusion products; with an MVTR of 0.4 gm/100 in$^2$/day before scoring; 0.5 gm/100 in$^2$/day after scoring the PVDC coated side; and 0.64 gm/100 in$^2$/day after scoring the clay coated printed side. The same combination of coatings on the uncoated side of C1S paperboard had an MVTR of 6.3 gm/100 in$^2$/day before scoring and 7.1 gm/100 in$^2$/day after scoring the clay coated printed side. MVTR of C2S board coated with inflexible coatings (Serfene 121 and 24X101) was 0.2 before scoring and 19.7 gm/100 in$^2$/day after scoring the clay coated printed side.

In the case of C2S boards, flexible coatings Serfene 400, Serfene 24X106, and ADCOTE 56-102 provided higher MVTR's before scoring/bending compared to inflexible coatings Serfene 121 and Serfene 24X101, but they produced lower MVTRs after scoring the PVDC coated side compared to the inflexible coatings. Scoring and bending the PVDC coated side increased the MVTR of C2S paperboard coated with inflexible coatings by more than an order of magnitude, while the corresponding MVTR of C2S paperboard coated with flexible PVDC coatings increased by 4–60. In the case of C1S paperboards, a combination of Serfene 400/Serfene 121 had lower MVTR's (unscored and scored) than those with inflexible coatings, and had comparable MVTR's to those of the PVDC/LDPE/board structure.

In summary, a flexible coating of Serfene 24X106 PVDC and a flexible coating of ADCOTE 56-102 PVP resin on C2S paperboard reduced the effect of scoring and bending on moisture vapor barrier significantly. After scoring and bending, the moisture barrier of this example was comparable to that of the PVDC/LDPE/board sample.

TABLE 1

| Top Coat/Primer Coat/Paperboard | MVTR(gm/100 in$^2$/day) 100° F./90% RH | | |
|---|---|---|---|
| | Un-scored | PVDC-side scored/bent | Print-side scored/bent |
| Commercial HDPE/EVOH Bag | 0.3 | | |
| Serfene 2060 on LDPE/Board | 0.66 | 0.65 | 0.69 |
| AET's PVDC on LDPE/.006" Board | 0.25 | 0.27 | 0.23 |
| AET's PVDC on C2S | 0.88 | 5.4 | 14.6 |
| *Serfene 121 on C2S | 0.37 | 9.3 | |
| *Serfene 24X101/Serfene 121 on C2S | 0.2 | 4.3 | 19.7 |
| Serfene 400/Serfene 121 on C2S | 0.14 | 0.145 | 18.41 |

TABLE 1-continued

| Top Coat/Primer Coat/Paperboard | MVTR(gm/100 in$^2$/day) 100° F./90% RH | | |
|---|---|---|---|
| | Un-scored | PVDC-side scored/bent | Print-side scored/bent |
| Serfene 24X106/Serfene 121 on C2S | 0.16 | 0.26 | 3.55 |
| Serfene 400/ADCOTE 56–102 on C2S | 0.28 | 0.29 | 10.62 |
| Serfene 24X106/ADCOTE 56–102 on C2S | 0.39 | 0.48 | 0.64 |
| *Serfene 121 on C1S w/preheat | 28.7 | 35.1 | |
| *Serfene 24X101/Serfene 121 on C1S | 1.99 | | |
| *Serfene 24X101/Polymer 10 | 0.68 | | 9.79 |
| Serfene 24X106 on C1S | 57 | 56.9 | |
| Serfene 400/Serfene 121 on C1S | 0.69 | 0.71 | 8.15 |
| Serfene 24X106/Serfene 121 on C1S | 3.66 | 6.45 | |
| Serfene 400/ADCOTE 56–102 on C1S | 1.56 | 2.44 | |
| Serfene 24X106/ADCOTE 56–102 on C1S | 6.33 | 4.36 | 7.12 |

Note: *Serfene 121 and Serfene 24X101 are inflexible PVDC coatings.

It will be seen from the above that a satisfactory solution to the problem of loss of moisture barrier with PVDC coated paper and paperboard upon scoring and bending may be reduced substantially with the use of a flexible coating of PVDC and a flexible primer coating of a PVP resin.

Thus while there is described herein what would be considered the preferred embodiment of the present invention, it will be apparent to those skilled in the art that various changes and modifications may be made therein without departing from the invention, and it is, therefore, aimed to cover all such changes and modifications as fall within the spirit and scope of the appended claims.

What is claimed is:

1. Packaging material prepared in a single pass on a printing press and having a low moisture vapor transmission rate after scoring and bending, comprising, a cellulosic substrate selected from paper or paperboard having at least one surface coated with a coating of particulate minerals to provide a printing surface, and another surface having thereon a layer of moisture barrier material comprising polyvinylidene chloride at a coat weight of from 3.4–4.5 lbs/ream (ream size 3000 ft$^2$) to provide a low moisture vapor transmission rate prior to scoring and bending, the improvement comprising the addition of a layer of flexible primer material comprising polyvinylpyrrolidone (PVP) resin at a coat weight of from 2–4 lbs/ream (ream size 3000 ft$^2$) between the substrate and the layer of moisture barrier material, said flexible primer material serving to retain the moisture vapor transmission rate characteristics of the packaging material after bending and scoring.

2. The packaging material of claim 1, wherein both surfaces of the cellulosic substrate are coated with coatings of particulate minerals.

* * * * *